United States Patent
Serbiak

(10) Patent No.: US 10,781,539 B2
(45) Date of Patent: Sep. 22, 2020

(54) AUTHENTICATABLE ARTICLES, FABRIC AND METHOD OF MANUFACTURE

(71) Applicant: Paul J. Serbiak, Lumberville, PA (US)

(72) Inventor: Paul J. Serbiak, Lumberville, PA (US)

( * ) Notice: Subject to any disclaimer, the term of this patent is extended or adjusted under 35 U.S.C. 154(b) by 0 days.

(21) Appl. No.: 16/311,095

(22) PCT Filed: Aug. 24, 2018

(86) PCT No.: PCT/US2018/047918
§ 371 (c)(1),
(2) Date: Dec. 18, 2018

(87) PCT Pub. No.: WO2019/040852
PCT Pub. Date: Feb. 28, 2019

(65) Prior Publication Data
US 2020/0173068 A1    Jun. 4, 2020

Related U.S. Application Data

(60) Provisional application No. 62/549,998, filed on Aug. 25, 2017.

(51) Int. Cl.
*A41D 27/00*        (2006.01)
*D03D 15/00*        (2006.01)
(Continued)

(52) U.S. Cl.
CPC ......... *D03D 15/0027* (2013.01); *A41D 1/005* (2013.01); *D03D 1/00* (2013.01);
(Continued)

(58) Field of Classification Search
CPC ... H04L 9/3247; H04L 2209/608; H04L 9/32; G07D 7/2033; G07D 7/0043;
(Continued)

(56) References Cited

U.S. PATENT DOCUMENTS 3,831,402 A * 8/1974 Schuman ............... D04B 15/66
                                                      66/218
3,978,179 A * 8/1976 Sundhauss ............... D04H 1/00
                                                      264/109

(Continued)

FOREIGN PATENT DOCUMENTS

WO    WO 2013/026098        2/2013

OTHER PUBLICATIONS

ISA/US; International Search Report prepared for PCT/US18/47918 to Serbiak, Paul J.; dated Oct. 12, 2018.

*Primary Examiner* — Robert H Muromoto, Jr.
(74) *Attorney, Agent, or Firm* — Joseph T. Guy; Kirk A. Wilson; Patent Filing Specialist, Inc.

(57) ABSTRACT

An article and method of manufacturing an authenticatable finished fabric and article comprising the steps of: obtaining an original fabric article comprising DNA fiber, the original fabric article being possessed by a celebrity at some time; breaking the original fabric article into DNA fiber components; blending the DNA fiber components with virgin fiber to make a DNA fiber blend; generating a DNA fiber blend yarn; weaving or knitting a finished fabric that is configured to form a binary code from a mixture of the DNA fiber blend yarn and a filling yarn; and creating a first level authentication and a second level authentication of the finished fabric.

25 Claims, 1 Drawing Sheet

(51) Int. Cl.
*D03D 1/00* (2006.01)
*G07D 7/0043* (2016.01)
*G06K 9/00* (2006.01)
*H04L 9/32* (2006.01)
*A41D 1/00* (2018.01)
*A41D 31/00* (2019.01)

(52) U.S. Cl.
CPC ....... *G06K 9/00288* (2013.01); *G07D 7/0043* (2017.05); *H04L 9/32* (2013.01)

(58) Field of Classification Search
CPC .... G07D 7/0034; G07D 7/005; G06K 19/086; G06K 9/00288; G06K 9/00577; G06K 19/06009; G06K 19/06037; G06K 19/06046; G06K 7/1434; G09C 5/00; G06F 21/64; G06Q 10/0833; G06Q 30/0185; D03D 1/0011; D03D 15/00; Y10T 442/3179; Y10T 442/3976; A41D 1/005; A41D 31/00
See application file for complete search history.

(56) References Cited

U.S. PATENT DOCUMENTS

| | | | | |
|---|---|---|---|---|
| 5,906,004 A * | 5/1999 | Lebby | .................... | A41D 31/00 139/425 R |
| 5,974,150 A * | 10/1999 | Kaish | .................. | G06K 19/086 283/85 |
| 6,475,634 B1 * | 11/2002 | Lam | ....................... | A47G 33/00 156/60 |
| 6,764,970 B1 * | 7/2004 | Kuoni | .................. | D03D 1/0011 139/426 R |
| 6,973,769 B2 * | 12/2005 | Meier | ..................... | D02G 3/34 139/426 R |
| 7,080,041 B2 * | 7/2006 | Nagel | .................. | G06K 19/086 380/202 |
| 7,089,420 B1 * | 8/2006 | Durst | ...................... | G09C 5/00 713/176 |
| 7,449,698 B2 * | 11/2008 | Nguyen | ............... | G01N 21/643 250/459.1 |
| 7,995,196 B1 | 8/2011 | Fraser | | |
| 8,530,863 B2 * | 9/2013 | Lawandy | ............... | D21H 21/40 250/486.1 |
| 8,669,079 B2 * | 3/2014 | Liang | .................... | C12Q 1/6895 435/91.2 |
| 9,269,034 B2 * | 2/2016 | Manion | ............. | G06K 19/0614 |
| 9,361,561 B2 * | 6/2016 | Bown | ................ | G01N 21/8806 |
| 9,442,074 B2 * | 9/2016 | McLeod | ............... | D06M 23/16 |
| 9,811,804 B1 * | 11/2017 | Goenka | ................ | G06Q 10/087 |
| 9,846,814 B1 * | 12/2017 | Fraser | ............... | G06K 9/00577 |
| 9,984,261 B2 * | 5/2018 | Gonzales, Jr. | ........ | G06Q 30/018 |
| 10,089,478 B1 * | 10/2018 | Fraser | .................. | G06T 1/0021 |
| 10,275,675 B1 * | 4/2019 | Fraser | ............... | G06K 9/00577 |
| 10,291,411 B1 * | 5/2019 | Durst | ........................ | G09C 5/00 |
| 10,508,367 B2 * | 12/2019 | Grant | .................. | D03D 1/0088 |
| 10,544,529 B2 * | 1/2020 | Barea | .................... | D04B 15/99 |
| 2003/0006170 A1 * | 1/2003 | Lawandy | ......... | G06K 19/06056 209/3.3 |
| 2003/0119391 A1 * | 6/2003 | Swallow | .................... | G01L 1/20 442/6 |
| 2005/0038756 A1 * | 2/2005 | Nagel | .................... | B42D 25/29 705/76 |
| 2005/0280534 A1 * | 12/2005 | Navarro | ................ | G06Q 30/02 340/572.1 |
| 2008/0009960 A1 * | 1/2008 | Jinlian | ................. | D03C 19/005 700/138 |
| 2013/0340543 A1 * | 12/2013 | Farahi | .................... | H04N 5/378 73/866.1 |
| 2015/0104800 A1 * | 4/2015 | Lee | .......................... | D04H 1/64 435/6.12 |
| 2015/0379903 A1 * | 12/2015 | McLeod | .................. | A24D 3/04 235/454 |
| 2017/0204543 A1 * | 7/2017 | Ting | ........................ | D04B 1/102 |
| 2017/0233902 A1 * | 8/2017 | Grant | .................... | G01K 13/00 139/425 A |
| 2018/0096178 A1 * | 4/2018 | Gonzales, Jr. | ........ | G06Q 30/018 |

* cited by examiner

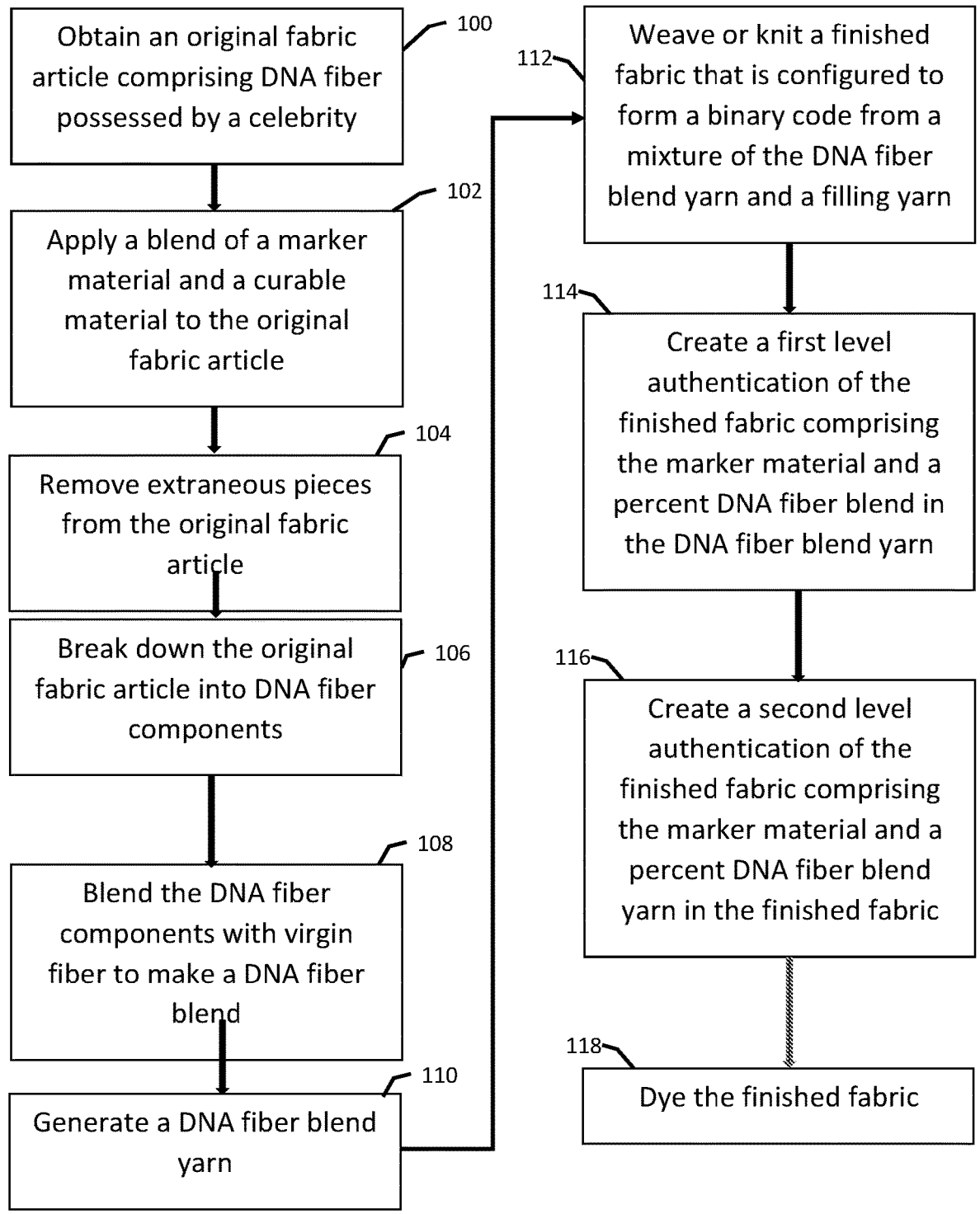

AUTHENTICATABLE ARTICLES, FABRIC AND METHOD OF MANUFACTURE

CROSS-REFERENCE TO RELATED APPLICATIONS

The present invention claims priority to U.S. Provisional Patent Application No. 62/549,998 filed Aug. 25, 2017, and is a National Phase filing for PCT/US18/47918, filed on Aug. 24, 2018.

TECHNICAL FIELD

The present invention is related to articles and fabrics which can be authenticated, or the articles containing the fabrics that can be authenticated, and methods of manufacturing authenticatable fabrics and articles. More specifically, the present invention is related to articles comprising multiple authentication elements. The present invention also relates to the creation of multiple collectable clothing items from a single or group of original collectable items. More specifically the present invention relates to the creation of multiple collectable items which have authentication elements.

BACKGROUND ART

Counterfeit goods are a significant problem that cost legitimate owners of proprietary products significant amounts of revenue. The apparel industry ranks third in lost revenue, due to counterfeiting, behind electronics and jewelry.

Labeling is one approach to limiting the counterfeiting of clothing. Increasingly sophisticated labels have been developed including holograms, barcodes, alphanumeric codes and the like all aimed at making duplication complicated. However, legitimate labels can be pirated and applied to counterfeit apparel or the label itself can be counterfeited. Furthermore, labels do not protect the final fabric article itself and once separated from the final fabric article the authentication, and therefore value, of the final fabric article may be irrevocably lost.

Fans of sports figures, musicians, actors, and other celebrities in the public eye often collect items of memorabilia that is associated with their heroes. These items are often limited in quantity and therefore they command a high, often unaffordable pricing. Therefore, memorabilia is often lucrative for potential fraud and counterfeiting activity. The buyer of rare memorabilia items is faced with concerns about authenticity.

A potential market is the creation of multiple collectable items from a single collectable item by subdividing the original item. For example, a baseball bat used in a game may be subdivided into small pieces and incorporated in a baseball card. A large market is thought to exist for replica clothing, wherein the clothing replicates a particular article of clothing worn during an event, wherein the replica has authenticated portions, such as thread, from the original clothing. This market has never reached the expected potential due to the propensity, and ease, of counterfeiting which severely mitigates the ability to demonstrate authenticity for the true replica.

It is difficult to track and authenticate collectable materials that are standardised, undifferentiated, substitutable, interchangeable, batch-processed in essentially identical form, and available in bulk or from a variety of sources. Examples of such materials include primary commodities, such as agricultural and mineral products, and processed commodities, such as manufacturing materials, building materials, clothing and industrial chemicals.

Luminescent marking materials have been proposed for identifying or authenticating high-value articles or materials and in particular security documents such as passports, banknotes, credit cards, cheques, as well as articles such as jewelry, vehicles, electronic goods, etc. However, prior luminescent marking systems require either relatively high amounts of luminescent materials to make detection reliable in ambient light or, when using trace amounts of luminescent materials, sophisticated and bulky laboratory spectrometers for detecting luminescence. High concentrations of luminescent materials are not practicable or cost-effective for tracking industrial process materials which are generally low-value commodity materials, typically mass-produced and sold in bulk. Furthermore, the use of laboratory detection equipment often requires detailed sample preparation by a trained analytical chemist and is not amenable to high-throughput mass screening of samples for off-site applications.

Various approaches to marking a fiber, or thread, for authentication of that fiber or thread are taught. High-resolution tracking of industrial process materials incorporating traces of luminescent markers is described in U.S. Pat. No. 9,361,561. Methods for marking threads and fibers is described in WO 2013/026098. Other approaches are disclosed for marking an overall garment with a label that is applied after the garment is completely constructed. Woven labels with an invisible bar code are described in U.S. Pat. No. 6,764,970, however, as discussed above the labels are only suitable if there is certainty in the correlation between the life cycle of the article and attached label. Clothing item registration systems are known such as in U.S. Publ. Appl. No. 2005/0280534.

There is an ongoing desire for authenticatable fibers, yarns, and/or components containing authenticatable fibers, and articles comprising the fibers. Provided herein are authenticatable fibers and authenticatable articles/items containing the fibers/components and a method for producing authenticatable articles.

DISCLOSURE OF THE INVENTION

One embodiment is an article and method of manufacturing an authenticatable finished fabric and article comprising the steps of: obtaining an original fabric article comprising DNA fiber, the original fabric article being possessed by a celebrity at some time; breaking the original fabric article into DNA fiber components; blending the DNA fiber components with virgin fiber to make a DNA fiber blend; generating a DNA fiber blend yarn; weaving or knitting a finished fabric that is configured to form a binary code from a mixture of the DNA fiber blend yarn and a filling yarn; and creating a first level authentication and a second level authentication of the finished fabric.

Another embodiment is fabric or article authenticated at least at two points in the manufacturing process.

Another embodiment is an article and method of manufacturing a collectible series of memorabilia items, comprising obtaining an original memorabilia item possessed by a celebrity at some time; breaking the original article down to constituent components; constructing an intermediate assembly or material from the constituent components, and making a final memorabilia item from the intermediate assembly or material.

BRIEF DESCRIPTION OF THE DRAWINGS

FIG. 1 illustrates process steps for making a exemplary embodiment of a final fabric article, some steps being optional.

MODES FOR CARRYING OUT THE INVENTION

The present invention is generally directed to a method of authenticating unique items, such as sports memorabilia items, trading cards, photographs, motivational prints, standees, lithographs, mini-jersey replicas, plaques, plates, trophies, autographed sports apparel, autographed sports equipment, magazine covers, pins, medallions, cels, figurines, steins, tankards, coins, signed art works, signed book editions, and musical and cinematic memorabilia. The term "item" or "article" as used hereinafter encompasses all of the aforementioned types of memorabilia and collectibles. The terms "marker" and "identifier", as used herein, can be interchangeable. The term "celebrity", as used herein, is someone who is known, famous or well-known in areas of entertainment such as sports, music, movies, or writing. The term "DNA fiber", as used herein, is equivalent to the term "authentic fiber".

The present invention is also directed toward authenticating articles and other items during at least two stages of the manufacturing process, for example during fiber making, yarn making, fabrication (such as knitting or weaving), cut and sew, labeling, packaging, final garment use and registration. Creating articles with authentication correlating to at least two levels is more secure and it is significantly harder for a counterfeit operation to duplicate multiple steps in the process. Furthermore, it is difficult if not impossible to add some forms of authentication after a specific stage of manufacture is complete. For example, once a counterfeit garment is made, the counterfeiter could not mark specific fibers in an intimate blend of fibers already in a yarn. Specifically, if clothing is made with a 60/40 cotton/poly fiber blend, after making the garment, it would be very difficult to add a marker to the polyester portion only. This step would have to be carried out at the polyester fiber manufacturing stage.

If marking is done only early in the process, such as at the fiber stage, then the fiber could be used to make counterfeit items in a later stage if the fiber is diverted away from the owner. Alternatively, if only a late stage maker is used, such as a label, the label could be used to mark goods that are not made with genuine fabric or yarn. In the present invention, the early stage and late stage markers are coordinated or paired in a deliberate manner, resulting in a final fabric article that is self-authenticating. This means that by deliberately coordinating the steps of the process that incorporate marking the resulting final fabric article is uniquely marked in a way that makes it hard to duplicate without duplicating all steps of the article making process. By including this data in a publicly transparent database, such as a blockchain database, the authenticity and provenance of the fiber and article are recorded and ultimately the ownership of the final fabric article is secured by owner data in the block chain.

Markers used at each authentication level can contain non-interacting data that is generally orthogonal to any other marker. Thus, each type of marker may be obtained through the use of different detection modalities that may each be non-interacting or otherwise independent of each other so that they do not interfere with each other or the ability to read each type of data independently of the other types of markers. Each type of marker may be encoded into various dimensions of each pixel of an image that can be readable through the use of shape, color and spectral shift recognition.

The unique serial number associated with the final fabric article identifies membership in a certain finite production run only when compared to a specific database entry and does not, in and of itself, identify the finite production run from which the final fabric article was produced. Further, the unique serial number does not identify the position in the finite run, but rather only membership in the finite production run.

Covert markers can be used in addition to overt markers. Overt markers are those that are easy to observe or are explicitly called out by the manufacturer. Overt markers may be difficult to copy, but they are known and a copy may be attempted by a skilled person. Covert markers are used alone or in conjunction with overt markers. The fact that the covert marker is difficult to even detect makes it less likely to be copied by others. In the present invention, even using all overt markers but at more than two stages of the manufacturing process, increases the security level significantly beyond single stage marking.

One embodiment of a marker material is a "luminescent marker" that refers to a marker material or mixture of marker materials which display fluorescence or phosphorescence (emission of light) as a result of a previous non-thermal energy transfer. Where, for example, a luminescent material is incorporated on and/or into the final fabric article according to any of the methods of the present invention, the final fabric article is said to be "marked" by the luminescent material. In this way the luminescent material is acting as a "luminescent marker" for that particular final fabric article. This marker may be selected from one or more luminescent materials which each provide a unique luminescent response when incorporated in and/or on the final fabric article. In this way the addition of the trace amount of the luminescent marker confers a unique identity to that final fabric article. The one or more luminescent materials respectively comprising the luminescent markers may be chosen to provide the unique identity by taking advantage of their unique luminescent profiles, for example, their excitation and emission frequencies and intensities A luminescent marker can therefore include one or more luminescent materials which individually or collectively have a unique luminescent emission and/or excitation profile.

Examples of luminescent marker materials which may be used individually or in combination as a luminescent marker in the methods of the present invention include luminescent organic materials such as aromatic and heteroaromatic monomers, fluorescent dyes known by many trade names, fluorescent polymers, light-emitting dopant functionalised polymers, luminescent metal complexes, phosphors, and luminescent nanoparticle materials.

Using either light upshifting or light downshifting technology with a luminescent marker material allows many combinations and permutations for making unique and orthogonal identifiers for authentication. The luminescent marker material enables chemical upshifts and/or downshifts from a specific wavelength to another specific wavelength. The identification measurement device can detect and measure the upshift or downshift and report quantitatively how much of the luminescent marker material is present and where the exact upshift or downshift occurs.

In one embodiment fibers can be marked with chemical markers, such as luminescent markers, that can be detected visually and/or optically. After the fibers are marked they can be intimately blended with other fibers, such as virgin fibers, which are not marked. The resulting fiber blend can then made into DNA fiber blend yarn. Yarns made with this DNA fiber blend can then used to weave a fabric. The fiber weave can be made up of the marked DNA fiber blend yarn and another non-marked yarn, such as a filling yarn. By combining the two yarns in a pre-determined pattern, the fabric weave can be orthogonally encoded. After forming the finished fabric, the fabric can be cut to a clothing pattern shape and sewn together using a specific thread to make a final fabric article. After sewing the final fabric article, a print pattern can be applied using a UV responsive ink. The final fabric article can then have a specific label with markings that are difficult to duplicate. The entire combination of marking at more than two stages of the final fabric article making process has formed a unique, self authenticating combination of markers for the final fabric article.

In another embodiment fibers are marked with chemical markers that can be detected visually or optically. After the fibers are marked they are intimately blended with more fibers which are not marked. The resulting fiber blend is then made into yarn. Yarns made with this intimate fiber blend are then used to weave a fabric. The fiber weave is made up of the marked fiber blend yarn and another non-marked yarn. By combining the two yarns in a pre-determined pattern, the fabric weave can be orthogonally encoded. After forming the woven fabric, the fabric is cut to a clothing pattern shape and sewn together using a specific thread. After sewing the final fabric article, a print pattern is applied using a UV responsive ink. Next the final fabric article has a specific label with markings that are difficult to duplicate and may include a unique serial number. The unique serial number can be in the form of a two dimensional bar code such as a quick response (QR) code. After that the completed and labeled final fabric article is autographed by the original wearer of the original final fabric article to further substantiate the providence of the final fabric article. Next the final fabric article is photographed and photographic recording of the final fabric article is entered into a data base relating the unique serial number to the photographic and other authenticating data. The data may be queried by authorized persons to verify the authenticity of the final fabric article. The data base may also incorporate ownership information, thus completing a loop of authenticating and correct ownership or title of the final fabric article. The entire combination of marking at more than 2 stages of the final fabric article making process has formed a unique, self authenticating combination of markers.

FIG. 1 illustrates process steps for making a exemplary embodiment of a final fabric article, with some steps being optional: 100 Obtain an original fabric article comprising DNA fiber possessed by a celebrity; 102 Apply a blend of a marker material and a curable material to the original fabric article; 104 Remove extraneous pieces from the original fabric article; 106 Break down the original fabric article into DNA fiber components; 108 Blend the DNA fiber components with virgin fiber to make a DNA fiber blend; 110 Generate a DNA fiber blend yarn; 112 Weave or knit a finished fabric that is configured to form a binary code from a mixture of the DNA fiber blend yarn and a filling yarn; 114 Create a first level authentication of the finished fabric comprising the marker material and a percent DNA fiber blend in the DNA fiber blend yarn; 116 Create a second level authentication of the finished fabric comprising the marker material and a percent DNA fiber blend yarn in the finished fabric; and 118 Dye the finished fabric.

In another embodiment, a method of manufacturing an authenticatable finished fabric and article is disclosed comprising the steps of: obtaining an original fabric article comprising DNA fiber, the original fabric article being possessed by a celebrity at some time; breaking the original fabric article into DNA fiber components; blending the DNA fiber components with virgin fiber to make a DNA fiber blend; generating a DNA fiber blend yarn; weaving or knitting a finished fabric that is configured to form a binary code from a mixture of the DNA fiber blend yarn and a filling yarn; and creating a first level authentication and a second level authentication of the finished fabric. The first level authentication and the second level authentication can be selected from the group consisting of a marker material on the original fabric article, a marker material on the DNA fiber components, a marker material on the DNA fiber blend yarn, a binary code in the finished fabric, a marker material on the finished fabric, a marker material on the finished fabric article, a serial number sewn on the finished fabric article, a percent DNA fiber blend in the DNA fiber blend yarn, a percent DNA fiber blend yarn in the finished fabric, and combinations thereof. Additional manufacturing steps can comprise applying a blend of a marker material and a curable material to the original fabric article; removing extraneous pieces from the original fabric article; dyeing the finished fabric; cuting and sewing a final fabric article from the finished fabric, the final fabric article comprising a unique serial number; recording the unique serial number in a database; marking the final fabric article with a substance containing the marker material; and autographing the final fabric article.

The database can have an entry at each method step and can be a blockchain distributed database. Database entries can be at least one of time, geomarker, DNA fiber type, virgin fiber type, marker material, marker test results, photographic evidence, finished fabric weights, shipping tracker information, unique serial number, finished fabric final fabric article type, description, color, size, sewing thread with a marker material, personal identifiable information for both current and former owners, and combinations thereof. The celebrity can be famous or well-known in at least one area of entertainment such as sports, music, movies, and writing. The original fabric article can be a game worn article.

The marker material can be a luminescent marker material and can be configured as a pen and applied to the original fabric article by the celebrity. The curable material can be ultra-violet curable. Extraneous pieces on the article can be patches, embroidery, zippers, buttons, and mixtures thereof.

For the DNA fiber blend yarn, the ratio of virgin fiber/ DNA fiber blend can be in the range of 25/1 to 75/1. For the finished fabric, the ratio of filling yarn/DNA fiber blend yarn can be in the range of 5/1 to 15/1. The DNA fiber blend can have a man-made marked polymer fiber, such as a polypropylene fiber, with marker material embedded in the polymer fiber. The marker material can be mixed with the curable material prior to curing.

The DNA fiber blend yarn can be configured in a specific sequence within the weave or knit to form a binary code comprising a repeat pattern in the range of 50 to 99. A unique serial number can be configured on a label, such as a bar code, and attached to the final fabric article. The bar code can be a two-dimensional barcode such as a quick response (QR) barcode.

Additional method steps can include stamping the final fabric article with an ink stamp having marker material in the ink, wherein the ink stamp is applied on a single piece of the final fabric article, or stamping the final fabric article with an ink stamp having marker material in the ink, wherein the ink stamp is applied on a seam of the final fabric article, thereby demonstrating that the stamp was applied after the sewing operation. The marker material can be a covert marker configured as a pen that is applied to the final fabric article by the celebrity.

Another embodiment of the invention can be a fabric or article authenticated at least at two points in the manufacturing process wherein the first authenticating point is in the first half of the manufacturing process and the second authenticating point is in the second half of the manufacturing process. Alternatively, the first authenticating point can be the first step of the manufacturing process and the second authenticating point can be the second step of the manufacturing process. Alternatively, every step of the manufacturing process can include authenticating.

Another embodiment of the invention can be a method of manufacturing a collectible series of memorabilia items using the method steps of: obtaining an original memorabilia item possessed by a celebrity at some time; breaking the original article down to constituent components; constructing an intermediate assembly or material from the constituent components, and making a final memorabilia item from the intermediate assembly or material. The memorabilia item can be selected from the group consisting of clothing, jewelry, bats, balls, clubs, hockey sticks, balls, saddles, bridles, musical instruments, props, and combinations thereof. The constituent components can be selected from the group consisting of metal, wood, fiber, cloth, plastic leather, and combinations thereof.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A method of manufacturing an authenticatable finished fabric and article, comprising:
   obtaining an original fabric article comprising authentic fiber, the original fabric article being possessed by a celebrity at some time;
   breaking the original fabric article into authentic fiber components;
   blending the fiber components with virgin fiber to make an authentic fiber blend;
   generating an authentic fiber blend yarn;
   weaving or knitting a finished fabric that is configured to form a binary code from a mixture of the authentic fiber blend yarn and a filling yarn; and
   creating a first level authentication and a second level authentication of the finished fabric.

2. The method of claim 1, wherein the first level authentication and the second level authentication are selected from the group consisting of a marker material on the original fabric article, a marker material on the authentic fiber components, a marker material on the fiber blend yarn, a binary code in the finished fabric, a marker material on the finished fabric, a marker material on the finished fabric article, a serial number sewn on the finished fabric article, a percent authentic fiber blend in the authentic fiber blend yarn, a percent authentic fiber blend yarn in the finished fabric, and combinations thereof.

3. The method of claim 2, further comprising:
   applying a blend of a marker material and a curable material to the original fabric article;
   removing extraneous pieces from the original fabric article; and
   dyeing the finished fabric.

4. The method of claim 3, further comprising:
   cutting and sewing a final fabric article from the finished fabric, the final fabric article comprising a unique serial number;
   recording the unique serial number in a database;
   marking the final fabric article with a substance containing the marker material; and
   autographing the final fabric article.

5. The method of claim 4, wherein the database further comprises an entry at each method step.

6. The method of claim 5, wherein the database further comprises a blockchain distributed database.

7. The method of claim 6, wherein the blockchain distributed database comprises entries selected from the group consisting of time, geomarker, authentic fiber type, virgin fiber type, marker material, marker test results, photographic evidence, finished fabric weights, shipping tracker information, unique serial number, finished fabric final fabric article type, description, color, size, sewing thread with a marker material, personal identifiable information for both current and former owners, and combinations thereof.

8. The method of claim 7, wherein the celebrity is famous or well-known in at least one area of entertainment such as sports, music, movies, and writing.

9. The method of claim 8, wherein the original fabric article comprises a game worn article.

10. The method of claim 2, wherein the marker material comprises a luminescent marker material.

11. The method of claim 3, wherein the curable material is ultra-violet curable.

12. The method of claim 2, wherein the marker material is configured as a pen and applied to the original fabric article by the celebrity.

13. The method of claim 3, wherein the extraneous pieces comprise patches, embroidery, zippers, buttons, and mixtures thereof.

14. The method of claim 1, wherein the ratio of virgin fiber/ authentic fiber blend in the authentic fiber blend yarn is in the range of 25/1 to 75/1.

15. The method of claim 1, wherein the authentic fiber blend further comprises a man-made marked polymer fiber, such as a polypropylene fiber, with marker material embedded in the polymer fiber.

16. The method of claim 2, wherein the marker material is mixed with the curable material prior to curing.

17. The method of claim 1, wherein the ratio of filling yarn/ authentic fiber blend yarn in the finished fabric is in the range of 5/1 to 15/1.

18. The method of claim 1, wherein the authentic fiber blend yarn is configured in a specific sequence within the weave or knit, thereby forming a binary code comprising a repeat pattern in the range of 50 to 99.

19. The method of claim 4, wherein the unique serial number is configured on a label attached to the final fabric article.

20. The method of claim 19, wherein the label comprises a bar code.

21. The method of claim 20, wherein the bar code is a two-dimensional barcode such as a quick response (QR) barcode.

22. The method of claim 2, further comprising:
   stamping the final fabric article with an ink stamp having marker material in the ink, wherein the ink stamp is applied on a single piece of the final fabric article.

23. The method of claim 2, further comprising:
   stamping the final fabric article with an ink stamp having marker material in the ink, wherein the ink stamp is applied on a seam of the final fabric article, thereby demonstrating that the stamp was applied after the sewing operation.

24. The method of claim 2, wherein the marker material comprises a covert marker and is configured as a pen that is applied to the final fabric article by the celebrity.

25. A final fabric article made by the process of claim 1.

* * * * *